United States Patent [19]

Raychaudhuri

[11] Patent Number: 4,710,452

[45] Date of Patent: Dec. 1, 1987

[54] THIN FILM AMORPHOUS OPTICAL RECORDING FILMS

[75] Inventor: Pranab K. Raychaudhuri, Rochester, N.Y.

[73] Assignee: Eastman Kodak Company, Rochester, N.Y.

[21] Appl. No.: 907,423

[22] Filed: Sep. 15, 1986

[51] Int. Cl.$^4$ .............................................. G03C 1/72
[52] U.S. Cl. ....................... 430/495; 430/19; 430/346; 430/945; 430/964; 346/135.1
[58] Field of Search ................ 430/19, 495, 945, 346, 430/964; 346/135.1

[56] References Cited

U.S. PATENT DOCUMENTS

| | | | |
|---|---|---|---|
| 4,268,840 | 5/1981 | Schank et al. | 346/135.1 |
| 4,357,616 | 11/1982 | Terao et al. | 346/135.1 |
| 4,581,317 | 4/1986 | Simmons, III | 346/135.1 |
| 4,659,588 | 4/1987 | Yamada et al. | 427/42 |

OTHER PUBLICATIONS

"New Ideas for Phase-Change Media-Achieving Sub-Microsecond Erase with Data Stability", by Chen et al, presented Oct. 15–17, 1985, IEEE and OSA, Washington, D.C.

"Systematic Phase Transformation Kinetics Measurements-Crystallization and Critical Quench Rates of the Binary Te–Ge System", Rubin et al, Oct. 15–17, 1985, IEEE, and OSA, Washington, D.C.

Primary Examiner—Richard L. Schilling
Assistant Examiner—Lee C. Wright
Attorney, Agent, or Firm—John R. Everett

[57] ABSTRACT

A recording element comprising, as the optical recording layer, an amorphous thin film of an alloy having the formula:

$$(Ge_xTe_{1-x})_{1-z}Ti_z$$

wherein, on an atom-to-atom basis,
x is from 0.33 to 0.55, and
z is greater than zero up to 0.30 is disclosed.

5 Claims, 3 Drawing Figures

THIN FILM AMORPHOUS OPTICAL RECORDING FILMS

FIELD OF THE INVENTION

This invention relates to optical recording elements.

BACKGROUND OF THE INVENTION

It is known that certain materials, which exist in a stable condition at room temperature, in either a substantially amorphous or substantially crystalline state can be converted from one of these states to the other by supplying sufficient energy to heat the material and then allowing it to cool under controlled conditions to a crystalline or an amorphous state.

It is also known that such materials may be used for storing and retrieving information. These materials may be used in the form of thin films for optical recordings. The thin films are written upon by selectively changing particular areas of the thin film from one state to the other (from amorphous to crystalline or crystalline to amorphous). Such change may be accomplished by providing a low amplitude energy pulse for sufficient duration to heat the material above its transition temperature after which the material cools to a crystalline state. On the other hand to convert the material from a crystalline to an amorphous state, rapid cooling is essential. This change, may be accomplished by pulsing the material with a high energy pulse source to raise the material to the melt temperature after which there must be a rapid drop in temperature freezing the material in the amorphous state before crystallization can occur.

Optical recording elements comprising thin films of GeTe alloys are known for use as optical recording layers. One such optical element is disclosed in papers entitled "New Ideas for Phase-Change Media Reversible Media—Achieving Sub-Microsecond Erase with Data Stability", Chen et al and "Systematic Phase Transformation Kinetics Measurements—Crystallization and Critical Quench Rates of the Binary Te-Ge System", Rubin et al. Both of the latter papers were presented at the Topical Meeting on Optical Data Storage, IEEE, and OSA in Washington, D.C. on Oct. 15–17, 1985.

In these papers, Ge-Te thin films are used for erasable recordings. In erasable recording the films have to be crystallized first using a long duration laser beam to form the "erased" condition. Data is then written on the film as localized amorphous spots using a high intensity short duration focused laser beam to raise the film above its melting point. The film is then quenched thereby forming the amorphous or written condition. Subsequent erasure of the data is done again by laser crystallization which is usually a slow process resulting in excessively long erasure time for many applications. The essence of these reports is that by using a stoichiometric GeTe composition, the crystallization rate can be significantly improved to allow laser pulse lengths as low as 250 nanoseconds for crystallization.

The problem is that such films cannot be used in write-once optical recording elements in which the written information is encoded in the crystallized state. The slow crystallization rate from the initial amorphous state makes the writing process prohibitively slow for most applications.

SUMMARY OF THE INVENTIION

The present invention provides an optical recording element comprising an amorphous thin film of an alloy having the formula:

$(Ge_xTe_{1-x})_{1-z}Ti_z$ wherein, on an atom-to-atom basis,
X is from 0.33 to 0.55, and
Z is greater than zero up to 0.30.

The optical recording elements of this invention possess a much improved crystallization rate compared to the above described prior elements. With the elements of this invention, crystallization is obtained using pulse lengths of 100 nanoseconds or less. The improved crystallization rate permits the use of the elements of this invention for high rate write-once recording using laser crystallization as the recorded state. Moreover, such elements exhibit high recording sensitivity and high carrier-to-noise ratios.

In a preferred embodiment the optical recording elements of the present invention comprise an amorphous thin film of an alloy having the formula:

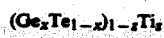

$(Ge_xTe_{1-x})_{1-z}Ti_z$ wherein, on an atom-to-atom basis,
X is from 0.38 to 0.48, and
Z is greater than zero up to 0.15.

The elements of this invention differ from the prior art in that Ti is incorporated in the Ge-Te thin films to improve performance. The films have markedly enhanced speed and sensitivity for laser crystallization in the near infrared region. That is, they generally require less laser writing power and laser pulse length than the GeTe films used in the prior art elements. The elements of this invention also are less susceptable to heat-induced deformation and thus exhibit less writing noise than GeTe thin films without Ti.

DETAILED DESCRIPTION OF THE PREFERRED EMBODIMENT

Figure 1:
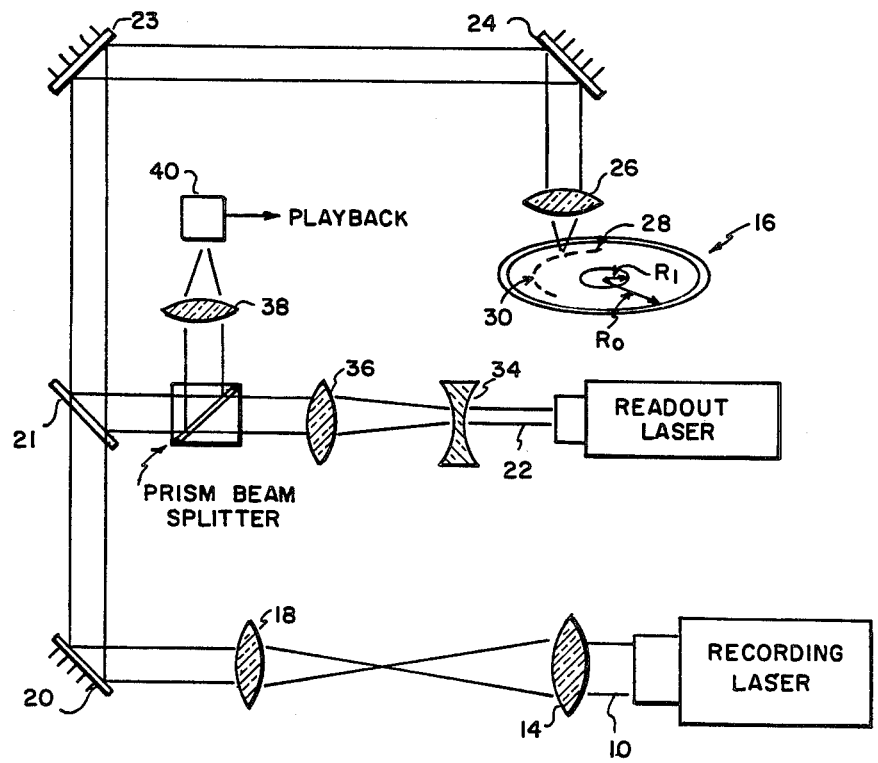
FIG. 1 is a description of a schematic recording and readback apparatus for using the recording elements of the invention.
Figure 2:
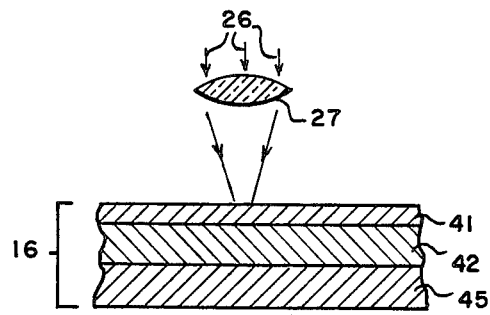
FIG. 2 is a schematic cross section of an optical recording element of this invention.

FIG. 1 shows a schematic of an apparatus for recording information on an optical recording element 16 of the invention and for playing back the recorded information therefrom. Recording element 16 comprises an overcoat layer 41, amorphous thin film optical recording layer 42 on substrate 43. In response to a drive signal, the intensity of a diode recording beam is modulated in accordance with information to be recorded on thin film 42. The modulated laser beam is collected by a lens 14 and collimated by a lens 18 and is directed by means of mirror elements 20, 23 and 24 to a lens 26 which focuses the modulated laser beam to a recording spot 28 on the film 42.

During recording, the element 16 is spun at a constant rate, e.g. 1800 rotations per minute (rpm). As a result, a track of information 30 is recorded on the optical recording layer in the form of selected crystallized areas. As recording continues, the recording spot 28 is caused (by means not shown) to scan radially inward across the element 16, thereby causing information to be recorded along a spiral or concentric track that extends from an outer radius $r_o$ to an inner radius $r_i$. The sizes and spacings of the recorded information marks vary in accordance with the information content of the recording laser drive signal, as well as with radial position on the element 16.

During the readback process, the new information bearing element 16 is spun at the same rate as it was spun during the recording process. A laser beam 22 from a readout laser is expanded in diameter by means of lenses 34 and 36. The optical path of the readout laser beam is folded by a beam splitter 21 and mirrors 23 and 24 so that the readout laser beam is focused to a playback spot on the element 16 by the high numerical aperture lens 26. The element 16 is assumed to be of the reflective type so that the radiation forming the playback spot is reflected back through the high numerical aperture lens 26 after interacting with the information marks recorded on the optical element 16. A lens 38 directs reflected laser radiation which has been diverted by the prism beam-splitter onto a detector 40 which produces an electrical playback signal in response to temporal variations (contrast) in the irradiance of the reflected laser radiation falling on the detector.

The amorphous thin film optical recording layers of this invention are written upon with a coherent beam of electromagnetic radiation of sufficient energy to convert selected portions of the amorphous film 42 to a crystalline state. In the present invention the amorphous thin film optical recording layers are of sufficient sensitivity that laser powers of about 2.5 to 10 mW at laser pulsewidth of 50 to 100 nanoseconds provides sufficient energy to make the conversion.

Recordings on the amorphous thin film were made with a static pit tester.

The static pit tester provides automated facilities for exposing standard test patterns on two-inch by two-inch glass slides of film samples with a laser. A microcomputer was used to control the sample position and the laser power. Each recording layer is exposed in the static pit tester to a power series array of 10 pits of 4 micron centers at each of six power levels (2, 3, 4, 6, 10 and 12 mW) on the sample, with a 40 to 30,000 nanoseconds pulse duration from a 830 nanometer diode laser. The suitability of the material for optical recording is determined by measuring the change in reflection between the exposed areas of the slide and the unexposed areas, i.e. between the amorphous and the crystalline areas.

This reflection change is expressed as recording contrast, CT, by the following definition:

$$CT = \frac{R_c - R_a}{R_c + R_a} \times 100\%$$

wherein $R_c$ and $R_a$ are the reflectances of the crystalline and the amorphous states respectively. A minimum contrast of 5 must be achieved for the films to be considered useful as optical recording layers.

The thin amorphous film recording layers can be prepared by conventional thin film deposition techniques such as evaporation, RF (radio frequency) and DC (direct current) sputtering from an alloy target, and RF and DC co-sputtering from targets of the individual elements. Enhancement of sputtering processes by applying magnetic fields (magnetron sputtering) can also be used. The thickness of the films can be from a few tens (10) to a few hundred nanometers (500 nm) depending on compromises among factors such as contrast, sensitivity, production rate, material cost, ease of control, data rate, etc.

It will be understood by those skilled in the art that Ti, when evaporated at the usual operating pressure, may form various Ti oxides. The invention, therefore, is intended to cover thin films in which a portion of Ti is present therein as an oxide.

Supports which can be used include plastic films, such as polyethylene terephthalate, polymethyl methacrylate, and polycarbonate, a glass plate, paper and metallic plates.

The practice of the invention can be best described by the following examples:

EXAMPLE 1

Control—A thin film of germanium-tellurium was prepared by vacuum evaporation from a boat containing GeTe as the source. The film was about 0.2 $\mu$m (2000A) in thickness and had a composition on an atom-to-atom basis of 45% germanium and 55% tellurium ($Ge_{0.45} Te_{0.55}$). Using a focused diode laser of wavelength 830 nm and 0.050 $\mu$s (50 ns) pulse length, recording marks (crystallized portions of film) could barely be made with a laser power of 8 mW or lower. Recorded marks showed deformation. The deformation was particularly noticeable in marks made at the longer pulse time of 1 $\mu$s or at high power levels. Recorded marks read with the diode laser gave a CNR value of 47 dB (30K Hz bandwidth).

Invention—A thin GeTe film, doped with titanium, was made using the vacuum evaporation procedure described for the control. The resulting film was about 0.2 $\mu$m thick and had a composition of 39% germanium, 52% tellurium, and 9% titanium $(Ge_{0.43} Te_{0.57})_{0.91} Ti_{0.09}$. Again, using the focused diode laser with 0.050 $\mu$s (50 ns) pulse length, good marks were made with laser power of less than 4 mW. At the longer pulse length of 1 $\mu$s, marks were made with significantly reduced deformation than those of the control. Reading the marks with the diode laser as before, a much improved CNR value of 62 dB (30K Hz bandwidth) was obtained.

EXAMPLE 2

Figure 3:
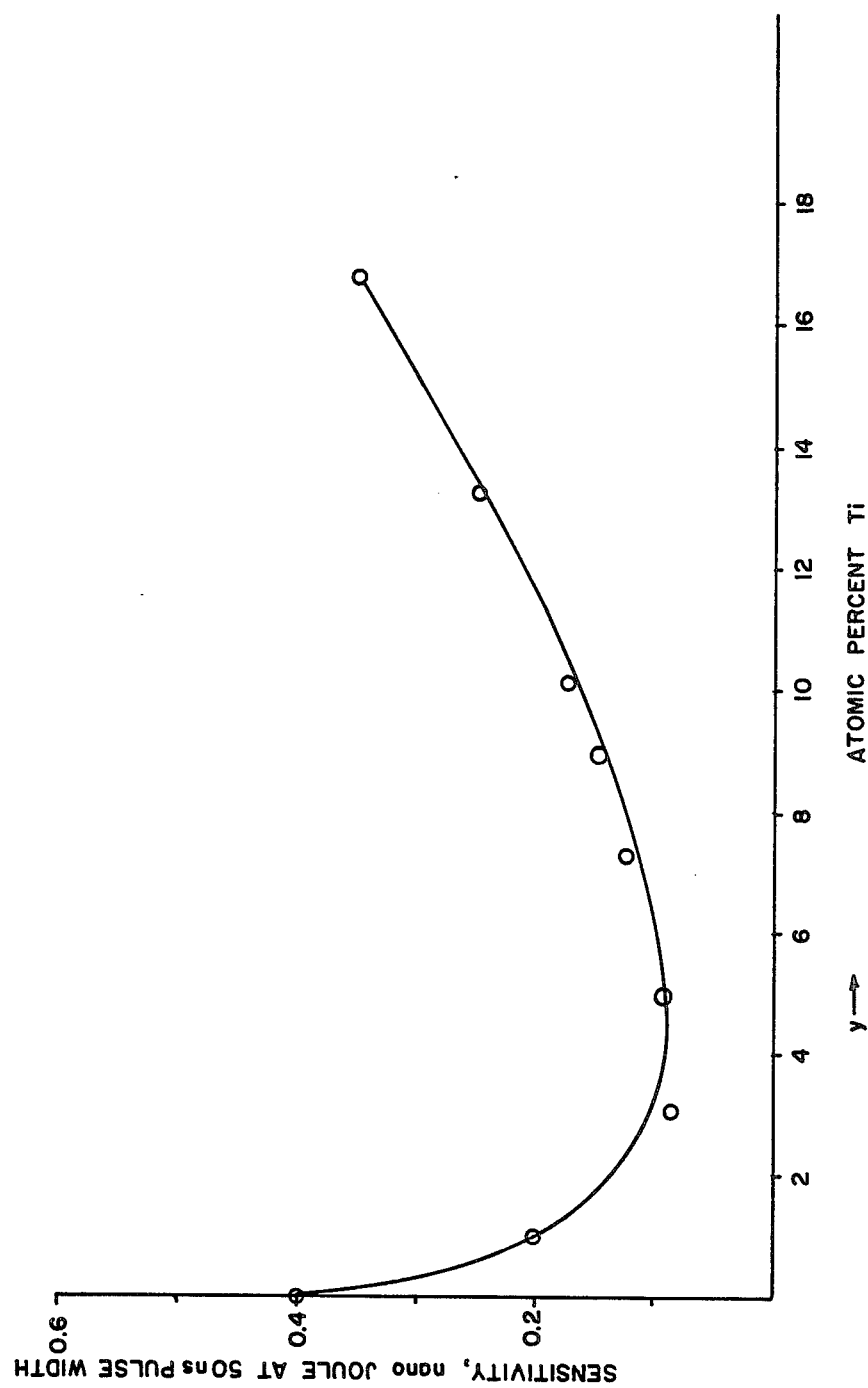
FIG. 3 is a curve showing the experimental results of Example 2 herein.

A series of thin films comprising germanium-tellurium and titanium were prepared as in Example 1. The films had a thickness of from 0.2 to 0.3 $\mu$m. The composition of each film prepared was $(Ge_{0.43} Te_{0.57})_{1-z} Ti_z$ where z varied from 0.01 to 0.168. Using the static pit tester, each of the films were subjected to a series of laser pulses. The graph in FIG. 3 shows the lowest laser power at a 0.050 $\mu$s (50 ns) pulsewidth required to produce a change in reflectivity of each film. Thus, the resulting data is a measure of the sensitivity of the prepared films. As can be seen from the graph, as the atomic percent of titanium in the films was increased, the sensitivity of the films to the laser increased until the concentration, z, of titanium present in the film reached about 0.05. Thereafter additions of titanium caused the sensitivity to decrease. However, throughout the range of z between 0.01 to 0.168, the sensitivity of the film is greater than that of the control film which required about 8 mW of power to produce a change in reflectivity. Moreover, crystallization was obtained with pulsewidths of 50 ns.

The invention has been described in detail with particular reference to preferred embodiments thereof, but it will be understood that variations and modifications can be effected within the spirit and scope of the invention.

I claim:

1. A recording element comprising, as the optical recording layer, an amorphous thin film of an alloy having the formula:

$$(Ge_xTe_{1-x})_{1-z}Ti_z$$

wherein, on an atom-to-atom basis,
x is from 0.33 to 0.55, and
z is greater than zero up to 0.30.

2. The element of claim 1, wherein x is from 0.38 to 0.48, and z is greater than zero up to 0.168.

3. The element of claim 1, wherein x is from 0.43 to 0.48, and z is from 1.0 to 0.168.

4. The element of claim 1, wherein x is 0.43, and z is 0.09.

5. The element of claim 1, wherein x is 0.43, and z is from 0.04 to 0.05.

* * * * *